United States Patent
Jeong et al.

(10) Patent No.: US 8,335,197 B2
(45) Date of Patent: Dec. 18, 2012

(54) METHOD AND APPARATUS FOR TRANSMITTING SIP DATA OF IDLE MODE UE IN A MOBILE COMMUNICATION SYSTEM

(75) Inventors: Kyeong-In Jeong, Hwaseong-si (KR); Himke Van Der Velde, Middlesex (GB); Sung-Ho Choi, Suwon-si (KR); Soeng-Hun Kim, Suwon-si (KR); O-Sok Song, Suwon-si (KR); No-Jun Kwak, Seoul (KR); Gert Jan Van Lieshout, Middlesex (GB)

(73) Assignee: Samsung Electronics Co., Ltd (KR)

( * ) Notice: Subject to any disclaimer, the term of this patent is extended or adjusted under 35 U.S.C. 154(b) by 1044 days.

(21) Appl. No.: 12/160,166

(22) PCT Filed: Jan. 4, 2007

(86) PCT No.: PCT/KR2007/000058
§ 371 (c)(1),
(2), (4) Date: Dec. 8, 2008

(87) PCT Pub. No.: WO2007/078159
PCT Pub. Date: Jul. 12, 2007

(65) Prior Publication Data
US 2009/0154408 A1    Jun. 18, 2009

(30) Foreign Application Priority Data

Jan. 4, 2006  (KR) .................. 10-2006-0001121

(51) Int. Cl.
*H04W 4/00*  (2009.01)

(52) U.S. Cl. .................................. 370/338; 370/328
(58) Field of Classification Search .................. None
See application file for complete search history.

(56) References Cited

U.S. PATENT DOCUMENTS

| | | | | |
|---|---|---|---|---|
| 6,567,667 | B1 * | 5/2003 | Gupta et al. ................ | 455/445 |
| 6,708,031 | B2 * | 3/2004 | Purnadi et al. .............. | 455/436 |
| 6,751,227 | B1 * | 6/2004 | Ahmavaara et al. ......... | 370/410 |
| 6,807,419 | B1 * | 10/2004 | Laiho et al. ................ | 455/436 |
| 6,845,095 | B2 * | 1/2005 | Krishnarajah et al. ....... | 370/349 |
| 6,961,571 | B1 * | 11/2005 | Rune et al. ................. | 455/442 |
| 6,963,543 | B2 * | 11/2005 | Diep et al. ................. | 370/261 |
| 6,990,359 | B2 * | 1/2006 | Wager ...................... | 455/561 |
| 7,020,477 | B2 * | 3/2006 | Cramby et al. ............. | 455/458 |
| 7,039,026 | B2 * | 5/2006 | Francoeur et al. .......... | 370/328 |
| 7,164,665 | B2 * | 1/2007 | Tourunen .................. | 370/328 |
| 7,215,958 | B2 * | 5/2007 | Kovacs et al. .............. | 455/436 |
| 7,224,977 | B2 * | 5/2007 | Cavalli et al. ............. | 455/452.1 |
| 7,260,080 | B2 * | 8/2007 | Suumaki et al. ............ | 370/342 |
| 7,283,506 | B2 * | 10/2007 | Mayer et al. ............... | 370/338 |

(Continued)

FOREIGN PATENT DOCUMENTS

KR    102004061079    7/2004

(Continued)

*Primary Examiner* — Bunjob Jaroenchonwanit
(74) *Attorney, Agent, or Firm* — The Farrell Law Firm, P.C.

(57) ABSTRACT

A method and apparatus are provided for transmitting a Session Initiation Protocol (SIP) message by a User Equipment (UE) in an idle mode in an Internet Protocol Multimedia Subsystem (IMS) system. The UE transmits one combined message of an AS control message and a NAS control message including information indicating transmission of an SIP message, thereby having an effect on an upper node to reduce a delay due to message processing.

20 Claims, 10 Drawing Sheets

U.S. PATENT DOCUMENTS

| | | | |
|---|---|---|---|
| 7,283,508 B2 * | 10/2007 | Choi et al. | 370/341 |
| 7,293,225 B2 * | 11/2007 | Sipila | 714/795 |
| 7,336,659 B2 * | 2/2008 | Meago | 370/390 |
| 7,349,696 B2 * | 3/2008 | Pedlar et al. | 455/434 |
| 7,415,274 B2 * | 8/2008 | Kauranen et al. | 455/435.2 |
| 7,424,061 B2 * | 9/2008 | Heikkila | 375/259 |
| 7,453,805 B2 * | 11/2008 | Velev et al. | 370/231 |
| 7,460,862 B2 * | 12/2008 | Pasanen et al. | 455/418 |
| 7,477,623 B2 * | 1/2009 | Chang | 370/329 |
| 7,489,672 B2 * | 2/2009 | Chitrapu et al. | 370/342 |
| 7,496,130 B2 * | 2/2009 | Rumney | 375/146 |
| 7,526,287 B2 * | 4/2009 | Hwang et al. | 455/422.1 |
| 7,668,145 B2 * | 2/2010 | Le et al. | 370/338 |
| 7,787,397 B2 * | 8/2010 | Olvera-Hernandez | 370/254 |
| 7,792,078 B2 * | 9/2010 | Haumont et al. | 370/331 |
| 7,852,817 B2 * | 12/2010 | Gallagher et al. | 370/338 |
| 7,953,404 B2 * | 5/2011 | De Benedittis et al. | 455/423 |
| 7,970,423 B2 * | 6/2011 | Sarkkinen et al. | 455/515 |
| 8,023,469 B2 * | 9/2011 | Sachs et al. | 370/331 |
| 8,081,596 B1 * | 12/2011 | Buracchini et al. | 370/328 |
| 8,090,392 B2 * | 1/2012 | Shaheen | 455/466 |
| 2003/0028644 A1 * | 2/2003 | Maguire et al. | 709/226 |
| 2003/0040314 A1 * | 2/2003 | Hogan et al. | 455/435 |
| 2003/0139183 A1 * | 7/2003 | Rantalainen | 455/435 |
| 2003/0156578 A1 * | 8/2003 | Bergenlid et al. | 370/352 |
| 2004/0029587 A1 * | 2/2004 | Hulkkonen et al. | 455/436 |
| 2004/0248615 A1 * | 12/2004 | Purkayastha et al. | 455/552.1 |
| 2005/0026597 A1 * | 2/2005 | Kim et al. | 455/412.1 |
| 2005/0141527 A1 * | 6/2005 | Gateva et al. | 370/401 |
| 2005/0157726 A1 * | 7/2005 | Vesterinen | 370/395.5 |
| 2006/0159031 A1 * | 7/2006 | Vialen et al. | 370/252 |
| 2006/0172741 A1 * | 8/2006 | Jeong et al. | 455/446 |
| 2006/0189272 A1 * | 8/2006 | Willenegger et al. | 455/3.01 |
| 2007/0025358 A1 * | 2/2007 | Beckmann et al. | 370/395.21 |
| 2007/0041343 A1 * | 2/2007 | Barreto et al. | 370/329 |
| 2007/0064710 A1 * | 3/2007 | Holmstrom et al. | 370/395.2 |
| 2007/0104178 A1 * | 5/2007 | Park et al. | 370/350 |
| 2007/0124472 A1 * | 5/2007 | Requena | 709/225 |
| 2007/0160072 A1 * | 7/2007 | Thalanany et al. | 370/401 |
| 2008/0069020 A1 * | 3/2008 | Richardson | 370/311 |
| 2008/0084871 A1 * | 4/2008 | Wang et al. | 370/352 |
| 2009/0052364 A1 * | 2/2009 | Gonsa et al. | 370/312 |
| 2009/0219843 A1 * | 9/2009 | Chin et al. | 370/310 |
| 2009/0252049 A1 * | 10/2009 | Ludwig et al. | 370/252 |
| 2010/0157873 A1 * | 6/2010 | Yi et al. | 370/312 |
| 2010/0279654 A1 * | 11/2010 | Funnell et al. | 455/410 |

FOREIGN PATENT DOCUMENTS

| | | |
|---|---|---|
| WO | WO 2004/049664 | 6/2004 |
| WO | WO 2005/046132 | 5/2005 |

* cited by examiner

METHOD AND APPARATUS FOR TRANSMITTING SIP DATA OF IDLE MODE UE IN A MOBILE COMMUNICATION SYSTEM

PRIORITY

This application claims priority under 35 U.S.C. §119(a) to an application filed in the Korean Intellectual Property Office on Jan. 4, 2006, and assigned Serial No. 1121/2006, and under 35 U.S.C. §365(c) to PCT application PCT/KR2007/000058 filed on Jan. 4, 2007, the contents of which are incorporated herein by reference.

BACKGROUND OF THE INVENTION

1. Field of the Invention

The present invention relates generally to a mobile communication system, and more particularly, to a method and apparatus for transmitting a Session Initiation Protocol (SIP) message by a User Equipment (UE) in an idle mode (hereinafter referred to as an "idle mode UE") in an Internet Protocol Multimedia Subsystem (IMS) system.

2. Description of the Related Art

FIG. 1 is a diagram illustrating control plane architecture of a $3^{rd}$ Generation Partnership Project (3GPP) system.

Referring to FIG. 1, reference numeral 101 denotes a protocol stack of a UE, reference numeral 111 denotes a protocol stack of a Radio Access Network (RAN), and reference numeral 121 denotes a protocol stack of a Core Network (CN).

The RAN 111, a network for managing radio access, is composed of Node B(s) and Radio Network Controller(s) (RNC). The Node B is a radio communication apparatus that directly participates in communication with the UE 101, and one Node B manages a plurality of cells. The RNC controls a plurality of Node Bs, and controls radio resources.

An interface between the UE 101 and the RAN 111 is called a Uu interface. The Uu interface and a Radio Resource Control (RRC) layer transmit/receive control information related to a radio access between the UE 101 and the RAN 111. In an upper node, the RRC layer is located in the RNC.

Control information of a lower node of the RRC layer will herein be referred to as Access Stratum (AS) control information.

An interface between the RAN 111 and the CN 121 is called an Iu interface. The Uu interface, the Iu interface, and a Call Control (CC)/Mobility Management (MM)/Session Management (SM)/Packet Mobility Management (PMM) layer transmit/receive control information related to call, session and/or mobility between the UE 101 and the CN 121.

The CC layer controls a Circuit Service (CS) call of the UE 101, exchanges service context information with the UE 101 for the CS call, and manages the information. The MM layer monitors and manages mobility of the UE 101 for the CS call.

The SM layer controls a session for a Packet Service (PS) of the UE 101, exchanges service context information with the UE 101 for the PS, and manages the information. The PMM layer monitors and manages mobility of the UE 101 for the PS service.

The CC/MM layer is located in a Mobile Switch Center (MSC), and the SM/PMM layer is located in a Serving GPRS Support Node (SGSN).

Control information of the CC/MM/SM/PMM layer in an upper node of the RRC layer will herein be referred to as NonAccess Stratum (NAS) control information.

Functions of the Node B, RNC, SGSN and MSC in FIG. 1 follow the 3GPP standard. In addition, Radio Link Control (RLC), Multiple Access Control (MAC), and Physical (PHY) layers are not directly related to the present invention. Functions of the other non-described layers follow the 3GPP standard.

FIG. 2 is a diagram illustrating a procedure for transmitting an SIP message for an IMS service by an idle mode UE in a 3GPP system.

Generally, in the 3GPP system, for efficient power use, an idle mode UE receives a Paging Indicator Channel (PICH) for determining the presence/absence of paging using a Discontinuous Reception (DRX) length, if there is no service or data being received.

In other words, the idle mode UE has no signaling connection for transmission/reception of control information between network nodes and also has no data channel for data transmission/reception, and service context information for the idle mode UE exists only in the MSC or SGSN, and does not exist in the RNC.

A description is provided of control information for the PS service and network nodes for the PS service. For example, in FIG. 1, control information of the SM/PMM layer in the NAS control information corresponds to the control information for the PS service. That is, the service context for the idle mode UE is managed by the SGSN.

Referring to FIG. 2, reference numeral 201 denotes a UE capable of receiving an IMS service, reference numeral 202 denotes a Node B for controlling a cell where the UE 201 is located, reference numeral 203 denotes an RNC for controlling the Node B 202, and reference numeral 204 denotes an SGSN to which the RNC 203 belongs.

If the UE 201 is in an idle mode and needs to transmit SIP data for the IMS service by an upper layer, the UE 201 should transition from the idle mode to a connected mode.

In step 211, the idle mode UE 201 performs an RRC connection establishment procedure.

In the idle mode UE 201, SIP data that needs to be transmitted by the upper layer can be transmitted through an INVITE message (hereinafter simply referred to as "INVITE") and a PERIODIC REGISTER message. The SIP protocol is a protocol for initializing a session between a destination UE and a source UE for IMS service reception, and the INVITE is SIP protocol data transmitted to open the IMS service session in order to send an IMS service request to a destination UE and adjust Quality of Service (QoS) of the service session.

In the RRC Connection Establishment of step 211, signaling connection between the UE 201 and the RNC 203 is established. Step 211 includes a messaging procedure of an RRC CONNECTION REQUEST message transmitted from the UE 201 to the RNC 203, an RRC CONNECTION SETUP message transmitted from the RNC 203 to the UE 201, and an RRC CONNECTION SETUP COMPLETE message transmitted from the UE 201 to the RNC 203.

Therefore, due to the RRC connection setup, the UE 201 and the RNC 203 form a channel on a radio interface, capable of transmitting AS control information and NAS control information. Control information included in the RRC connection establishment procedure is the AS control information.

After the RRC connection of step 211 is established, the UE 201 transmits a SERVICE REQUEST message in step 221.

The SERVICE REQUEST message establishes a logical association between the UE 201 and the SGSN 204, and NAS control information between the SGSN 204 and the UE 201 can be transmitted/received through the logical connection. That is, a path on the Uu interface for transmission of control information between the UE 201 and the RNC 203 is established through the RRC connection establishment, and a path on the Iu interface for transmission of control information between the RNC 203 and the SGSN 204 for the UE 201 is established through the SERVICE REQUEST message. In addition, the SERVICE REQUEST message includes service type information and Packet Data Protocol (PDP) Context status information.

Therefore, using service type information of the service desired by the UE 201 and PDP context information kept in the SGSN 204, the RNC 203 and the SGSN 204 can set up a Radio Access Bearer (RAB) for transmission of the service data.

The RAB setup process starts with a RAB ASSIGNMENT REQUEST message of step 241. Iub data transport bearer setup is provided from the Node B 202 to the RNC 203 in step 242. A RADIO BEARER SETUP message is sent from the RNC 203 to the UE 201 in step 243, and a RADIO BEARER COMPLETE message is sent from the UE 201 to the RNC 203 in step 244. The RAB setup is completed when the SGSN 204 receives a RAB ASSIGNMENT RESPONSE message of step 245.

That is, in order to transmit SIP data, the UE 201 sends a service request message to the SGSN 204. Upon receipt of the service request message, the SGSN 204 sets up a RAB for SIP data transmission, and then can transmit the SIP data through the set SIP RAB.

Steps 231 through 234 correspond to a procedure for local authentication between the UE 201 and the RNC 203.

In step 231, the RNC 203 receives, from the SGSN 204, a Ciphering key (Ck) and an Integrity check key (Ik) to be used for communication with the UE 201.

With the use of the security-related parameters (ciphering algorithm/integrity check algorithm supported by the UE 201 and the like, for example, START) received from the UE 201 in step 211, the security-related parameters (ciphering algorithm/integrity check algorithm supported by the SGSN 204 and the like, for example, Ck and Ik) received from the SGSN 204 in step 231, and the security-related parameters (for example, FRESH) generated directly by the RNC 203, the RNC 203 generates a Message Authentication Code (MAC) and transmits the MAC to the UE 201 in step 232.

Upon receiving the MAC through step 232, the UE 201 calculates an eXpected MAC (XMAC) with the use of the security-related parameters START, Ck, Ik and the like, kept therein, and the security-related parameters (FRESH and the like) received in step 232.

If the calculated XMAC is identical to the MAC received in step 232, the UE 201 authenticates the RNC 203, and sends a SECURITY MODE COMMAND COMPLETE message in step 233. The SECURITY MODE COMMAND COMPLETE message includes the MAC calculated for the SECURITY MODE COMMAND COMPLETE message by the UE 201. Upon receiving the SECURITY MODE COMMAND COMPLETE message, the RNC 203 calculates an XMAC for the SECURITY MODE COMMAND COMPLETE message. If the calculated XMAC is equal to the MAC received in step 233, the RNC 203 authenticates the UE 201, and sends the SECURITY MODE COMMAND COMPLETE message to the SGSN 204 in step 234, informing the successful execution of the security mode command.

A detailed description of the security mode command procedure in steps 231 through 234 is provided in TS 33.102 v630 and TS 25.331 v670 of 3GPP.

If the security procedure is completed through the security mode command of steps 231 to 234, a RAB for SIP data transmission is set up in steps 241 to 245. The SIP data transmission is not possible until the SIP RAB setup procedure is completed.

Thereafter, in step 251, the UE 201 sends the INVITE, which is SIP data, to the SGSN 204.

In order to allow the UE to receive the existing IMS service operating as described above, SIP data should be transmitted for session initialization of the service.

However, as shown in FIG. 2, in the existing 3GPP system, the SIP data (for example, INVITE) cannot be transmitted until the RRC connection establishment of step 211, the transmission of the service request message of step 221, the security procedure of steps 231 to 234, and the SIP RAB setup of steps 241 to 245 are completed.

As a result, the existing mobile communication system may experience a transmission delay due to service transmission between an end and another end as it supports the IMS service. That is, an end-to-end delay may increase between a destination UE and a source UE, between a source UE and a destination UE, and between a UE and each node.

SUMMARY OF THE INVENTION

The present invention has been made to address at least the above problems and/or disadvantages and to provide at least the advantages described below. Accordingly, an aspect of the present invention provides a method and apparatus for efficiently transmitting SIP data in an idle mode UE to reduce an end-to-end delay, which may occur in SIP data transmission for an IMS service in an IMS system for mobile communication.

Another aspect of the present invention provides a method and apparatus for transmitting an AS control message related to RRC connection establishment and a connection request message, including a NAS control message, reconfigured from all NAS control information, and SIP data, transmitted from a UE before SIP data transmission, in transmitting SIP data for an IMS service, and receiving a response message in reply thereto, thereby enabling SIP data transmission.

According to one aspect of the present invention, a method is provided for transmitting SIP data by an idle mode UE in a mobile communication IMS system. The UE delivers SIP data received from an upper layer in an idle mode to a NAS layer. The NAS layer sets a message type of a NAS control message as a Long Term Evolution (LTE) connection request message including SIP data. For the setting of the LTE connection request message, the NAS layer sets an SIP data indicator and SIP data packet length information in the NAS control message in front of a part where the SIP data is to be included, generates a single combined message by attaching the SIP data to the rear of the SIP data packet length information of the NAS control message, and delivers the generated single combined message to an AS layer. The AS layer generates an AS control message, and generates an LTE connection request message by combining the provided combined message with the AS control message. The AS layer sends a scheduling request to an Evolved Radio Access Network (E-RAN). Upon receipt of a scheduling response message from the E-RAN, the AS layer sends the LTE connection request message to the E-RAN using allocated radio resources in response to the scheduling response message.

According to another aspect of the present invention, a method is provided for transmitting SIP data of an idle mode UE in a mobile communication IMS system. An LTE connection request message is received from the idle mode UE, and message type information of a NAS control message is checked. If the message type information indicates an LTE connection request message including SIP data, NAS control information of the NAS control message is processed, an SIP data indicator and SIP data packet length information for the SIP data are extracted from the NAS control message, and the extracted information is analyzed. The SIP data is extracted from the LTE connection request message. An LTE connection response message is sent to an E-RAN to set up an SIP RAB to the UE. The SIP data is sent to a corresponding destination network node using NAS control information included in the NAS control message. Upon receipt of response SIP data for the SIP data, the response SIP data is sent through the SIP RAB.

According to a further aspect of the present invention, a method is provided for transmitting/receiving data through an SIP in a mobile communication system. An idle mode UE includes data to be transmitted through the SIP in one connection request message composed of AS control information needed in an E-RAN, and NAS control information needed in an Evolved Core Network (E-CN). The idle mode UE sends the connection request message to the E-CN. The E-CN sets an RAB for transmitting the data using the NAS control information, and sends a connection response message including the AS control information to the E-RAN. The E-RAN sets up a Radio Resource Control (RRC) connection for transmitting the data using the AS control information, and sends the connection response message to the UE.

According to yet another aspect of the present invention, a method is provided for transmitting/receiving data through an SIP in a mobile communication system. An idle mode UE includes data to be transmitted through the SIP in one connection request message composed of AS control information needed in an E-RAN and NAS control information needed in an E-CN. The idle mode UE sends the connection request message to the E-RAN. The E-RAN performs deciphering and/or integrity protection check on the connection request message, extracts and manages AS control information from the connection request message, and transmits the connection request message including the NAS control information and the data to the E-CN. The E-CN sets up an RAB for transmitting the data using the NAS control information, and sends a connection response message to the E-RAN. The E-RAN sets up an RRC connection for transmitting the data using the AS control information, and sends the connection response message to the UE.

According to an additional aspect of the present invention, a User Equipment (UE) apparatus is provided for transmitting multimedia data through an SIP. The UE apparatus includes a data generator for generating multimedia data to be transmitted through the SIP, and a status manager for monitoring a mode of the UE apparatus. The UE apparatus also includes a first control message generator for generating an NAS control message including control information for RAB setup due to an idle mode from the status manager, and multimedia data generated from the data generator. The UE apparatus further includes a second control message generator for generating one connection request message including the NAS control message and control information for RRC setup, and a transceiver for sending the generated connection request message to an upper node.

According to still another aspect of the present invention, a Core Network (CN) apparatus is provided for transmitting multimedia data through an SIP. The CN apparatus includes a transceiver for receiving a connection request message from a lower node, and a first control information extractor for extracting, from the connection request message, a NAS control message including control information for RAB setup, which is set as message type information indicating a message including the multimedia data. The CN apparatus also includes a data extractor for extracting the multimedia data from the connection request message according to the message type information, a RAB setup manger for setting up a RAB to the lower node using the control information, and a NAS control information extractor for routing the multimedia data to a destination network node using the control information. The CN apparatus further includes a mapping information manager for managing mapping information between the destination network node and the RAB set up for transmission of the multimedia data, and a transceiver for receiving a response message corresponding to the multimedia data from the destination network node, and sending the response message to the lower node.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Figure 1:
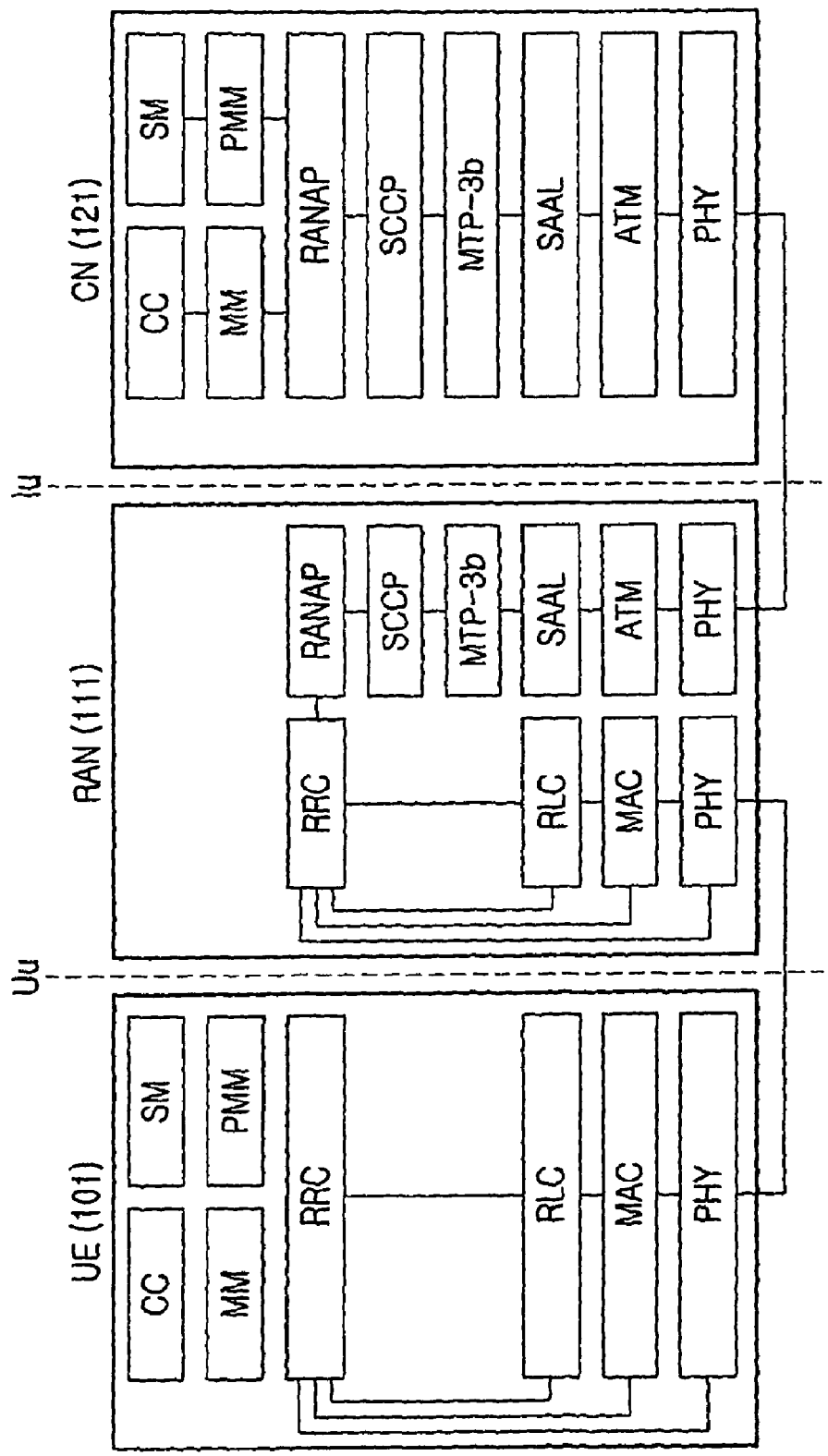
FIG. 1 is a diagram illustrating control plane architecture of a $3^{rd}$ Generation Partnership Project (3GPP) system.
Figure 2:
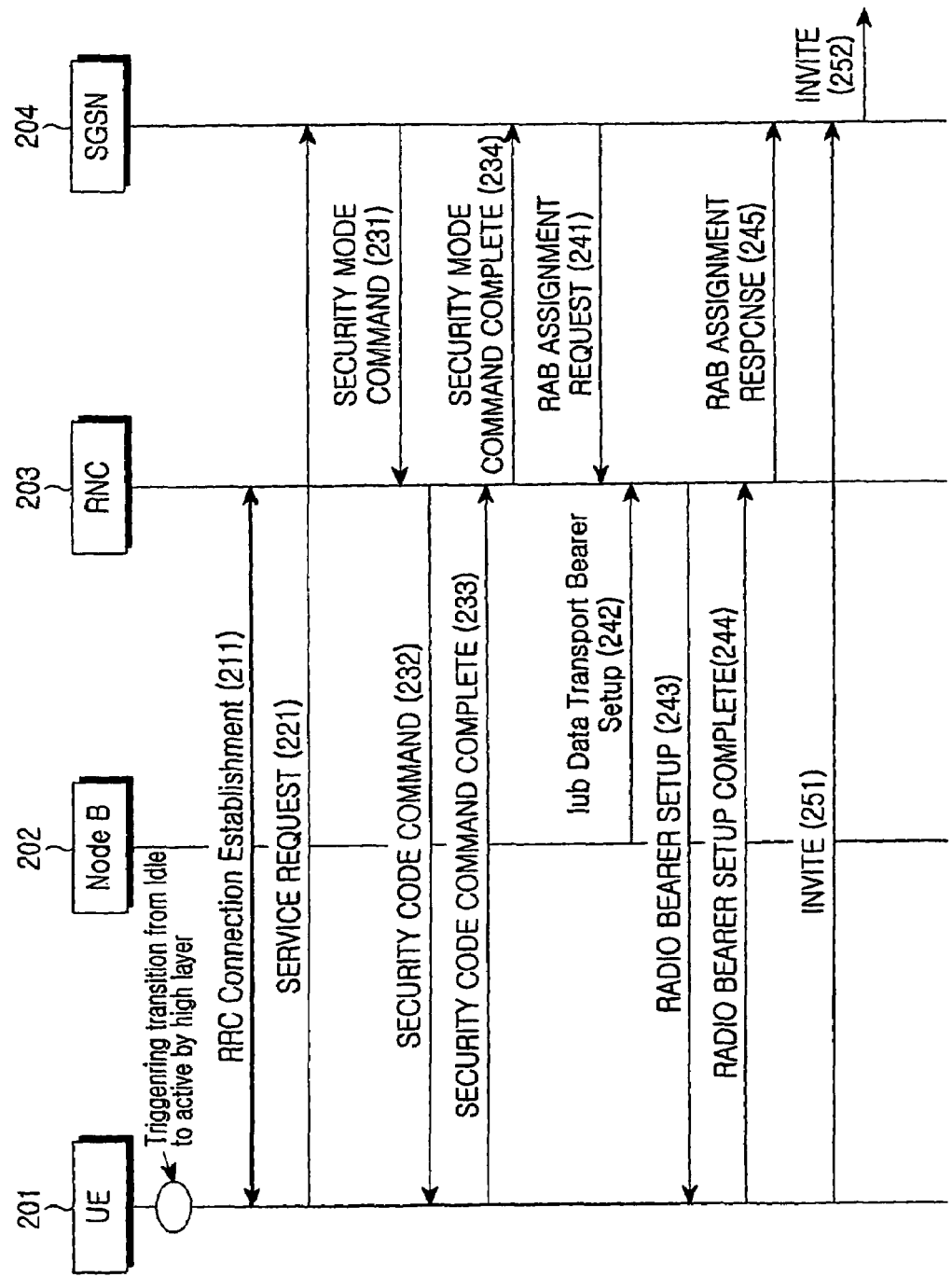
FIG. 2 is a diagram illustrating a procedure for transmitting an SIP message by an idle mode UE in a 3GPP system.

Preferred embodiments of the present invention are described in detail with reference to the accompanying drawings. Similar components are designated by similar reference numerals although they are illustrated in different drawings. Detailed descriptions of constructions or processes known in the art may be omitted to avoid obscuring the subject matter of the present invention.

Although preferred embodiments of the present invention are described herein with reference to an LTE system, by way of example, the present invention can be applied to any communication system employing a DRX mode without a separate modification. In addition, the present invention can also be applied to a mobile communication system employing Node B scheduling without modification. Further, the present invention can also be applied to a communication system supporting multimedia services using an Internet Protocol (IP).

Figure 3:
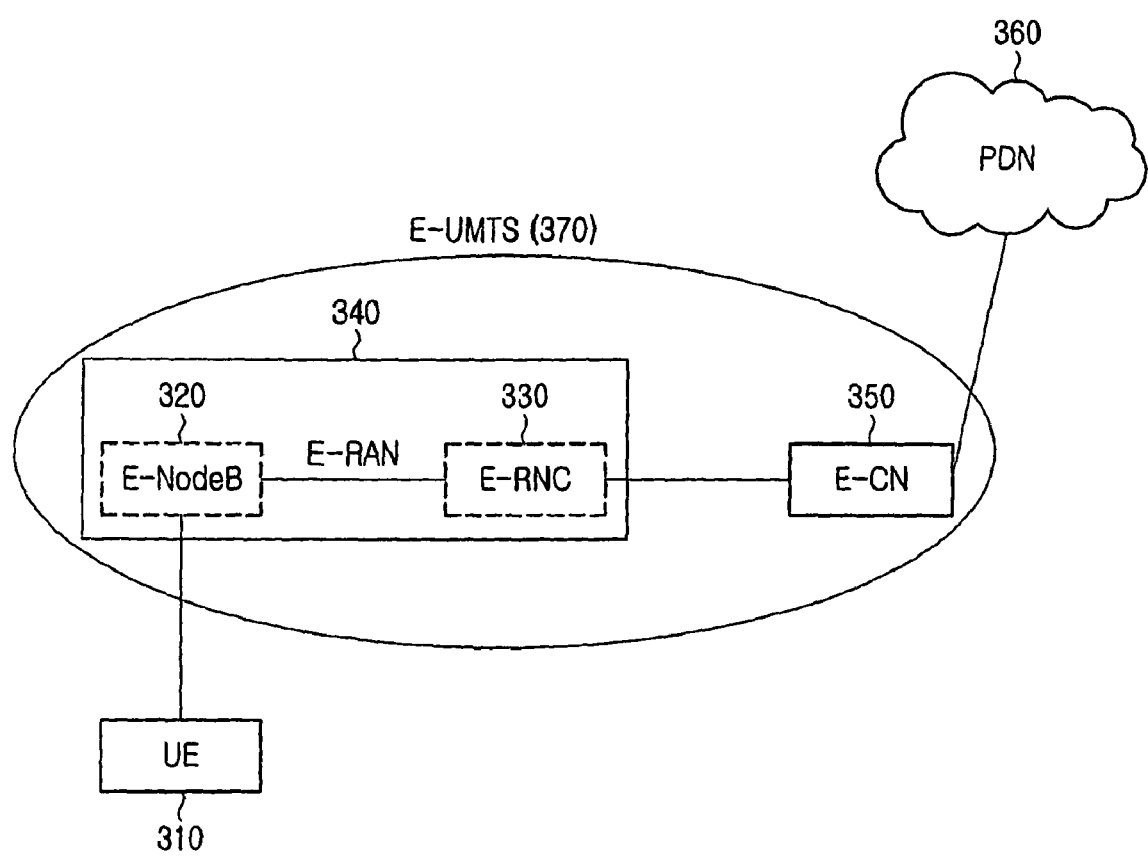
FIG. 3 is a diagram illustrating a configuration of a mobile communication system to which the present invention is applicable.

FIG. 3 is a diagram illustrating a configuration of a mobile communication system to which the present invention is applicable. A description of FIG. 3 will herein be made with reference to a 3GPP LTE system, also known as an Evolved Universal Mobile Telecommunications System (E-UMTS), which is now under discussion as the next generation mobile communication system in the 3GPP standard.

Referring to FIG. 3, reference numeral 310 denotes a UE for the 3GPP LTE system, and reference numeral 340 denotes an E-RAN.

The E-RAN 340 is a network device that performs functions of both a Node B and an RNC in the existing 3GPP system. Functions of an Evolved Node B (E-NB) 320 and an Evolved RNC (E-RNC) 330 may be physically separated in different nodes, or merged in the same node.

An Evolved CN (E-CN) 350 can be a merged node of an SGSN and a Gateway GPRS Support Node (GGSN) in the existing 3GPP system. The E-CN 350, located between a Packet Data Network (PDN) 360 and the E-RAN 340, serves as a gateway for allocating an IP address to the UE 310 and connecting the UE 310 to the PDN 360.

A definition of the SGSN and the GGSN is provided in the 3GPP standard. Although preferred embodiments of the present invention are described herein with reference to the system configuration of FIG. 3, by way of example, the present invention can also be applied to the existing 3GPP system or other systems.

Figure 4:
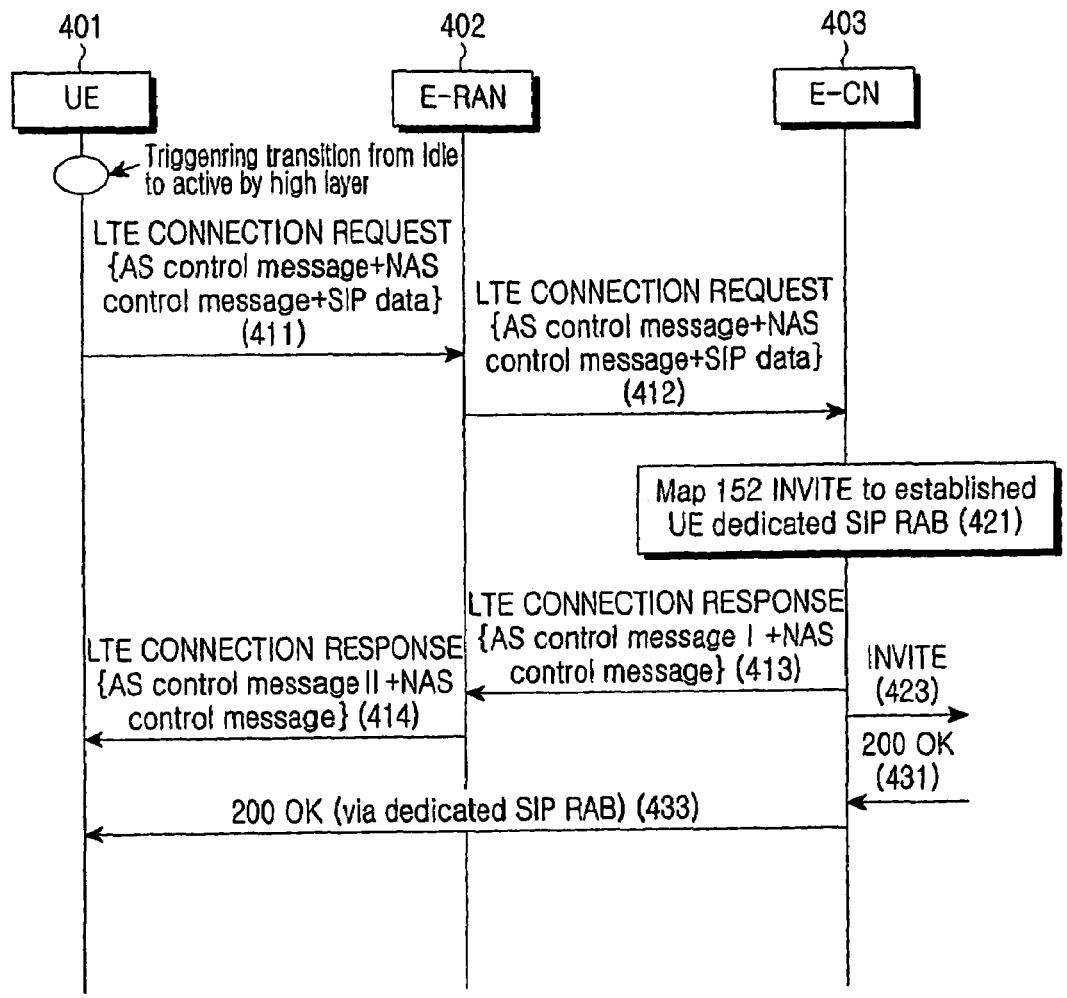
FIG. 4 is a diagram illustrating a transmission procedure of an SIP message by an idle mode UE according to an embodiment of the present invention.

FIG. 4 is a diagram illustrating a transmission procedure of an SIP message by an idle mode UE in an IMS system for mobile communication according to an embodiment of the present invention.

Referring to FIG. 4, reference numeral 401 denotes an LTE UE, reference numeral 402 denotes an E-RAN, and reference numeral 403 denotes an E-CN.

If the UE 401 in an LTE idle mode needs SIP data transmission to receive an IMS service by an upper layer, it should transition from the LTE idle mode to an LTE active mode. For this purpose, the UE 401 sends an LTE CONNECTION REQUEST message to the E-CN 403 via the E-RAN 402 in steps 411 to 412.

The LTE CONNECTION REQUEST message is one message including an AS control message (information), a NAS control message (information), and SIP data. Alternatively, the LTE CONNECTION REQUEST message can be a message configured to include the AS control message (information) and the NAS control message (information), and configured to additionally transmit the SIP data. In FIG. 4, the SIP data to be transmitted due to the IMS service is assumed to be an INVITE.

The AS control message included in step 411 is one AS control message reconfigured from all necessary control information of RRC messages transmitted from the UE 401 before INVITE transmission. The AS control message can further include control information of the RRC message transmitted in the existing 3GPP system and new control information not included in the RRC message of the existing 3GPP system.

That is, the AS control message of step 411 includes the necessary control information included in the RRC CONNECTION REQUEST, RRC CONNECTION SETUP COMPLETE, Initial Direct Transfer (IDT), SECURITY MODE COMMAND, and RADIO BEARER SETUP COMPLETE messages that the UE 401 transmits before it transmits the INVITE in the existing 3GPP system, and also includes the new AS control information.

The IDT message transmits an initial NAS control message to the corresponding E-CN 403, and is an RRC message used for setting up a signaling connection for control information exchange with the E-CN 403. The IDT message includes identity (ID) information of the UE 401 and information on the E-CN 403 selected by the UE 401. The IDT message is transmitted along with a service request message, which is a NAS control message. From the IDT message, an RNC acquires information on an E-CN to which it should transmit the service request message, and forwards the service request message to the corresponding E-CN according to the acquired information. A detailed description of each of the RRC messages is provided in TS 25.331 v670 of 3GPP.

The NAS control message included in step 411 is one NAS control message reconfigured from all NAS control information transmitted from the UE 401 before the UE 401 transmits the INVITE. The NAS control message can further include the control information transmitted in the existing 3GPP system, and new control information not included in the existing 3GPP system.

That is, the NAS control message can be a service request message that the UE transmits before INVITE transmission in the existing 3GPP system. A detailed description of the NAS control message of the existing 3GPP system is provided in TS 24.008 v670 of 3GPP.

The SIP data included in step 411 indicates the INVITE transmitted/received through an SIP protocol for supporting the IMP service.

In other words, in step 411, the LTE CONNECTION REQUEST message is configured with one AS control message and one NAS control message from among the AS control messages and NAS control messages transmitted through a plurality of procedures, before INVITE transmission in the existing 3GPP system. Alternatively, one LTE CONNECTION REQUEST message can be generated by including the INVITE, which is SIP data transmitted after setup of an SIP RAB, in the message including the AS control message and the NAS control message.

In step 412, upon receiving the LTE CONNECTION REQUEST message, the E-RAN 402 forwards the LTE CONNECTION REQUEST message to the corresponding E-CN 403 using information on the E-CN 403 selected by the UE 401 and a Packet Temporary Mobile Subscriber Identity (P-TMSI) of the UE 401, both included in the LTE CONNECTION REQUEST message.

If deciphering and/or integrity protection check is performed on the LTE CONNECTION REQUEST message in the E-CN 403, the E-RAN 402 forwards the LTE CONNECTION REQUEST message to the E-CN 403 as it is. After successfully performing deciphering and/or integrity protection check on the LTE CONNECTION REQUEST message, the E-CN 403 may retransmit the AS control message included in the LTE CONNECTION REQUEST message to the E-RAN 402 in step 413.

If a deciphering and/or integrity protection check is performed on the LTE CONNECTION REQUEST message in the E-RAN 402, the E-RAN 402, after successfully performing deciphering and/or integrity protection check on the LTE CONNECTION REQUEST message, may include the NAS control message and the INVITE, except for the AS control message, in the LTE CONNECTION REQUEST message, and deliver the resulting message to the corresponding E-CN 403.

This is because the AS control message includes the control information needed in the E-RAN 402, and the NAS control message includes the control information needed in the E-CN 403.

It is assumed in FIG. 4 that the deciphering and/or integrity protection check is performed on the LTE CONNECTION REQUEST message in the E-CN 403. Therefore, as for the LTE CONNECTION REQUEST message of step 412, the LTE CONNECTION REQUEST message of step 411 received at the E-RAN 402 is forwarded to the E-CN 403 as it is. Accordingly, as to the AS control message needed in the E-RAN 402, the E-RAN 402 can extract and keep only the AS control message when receiving the LTE CONNECTION REQUEST message, or can receive the AS control message re-delivered from the E-CN 403 through an LTE CONNECTION RESPONSE message of step 413.

In FIG. 4, it is assumed that the E-RAN 402 receives the AS control message included in step 411, re-delivered from the E-CN 403, through the LTE CONNECTION RESPONSE message of step 413.

When transmitting the LTE CONNECTION REQUEST message of step 411, the UE 401 needs information indicating whether the INVITE, which is SIP data, is included in the LTE CONNECTION REQUEST message, and information on the INVITE packet position. This is because the E-CN 403, which receives the LTE CONNECTION REQUEST message of step 412 based on the information on the INVITE packet position, extracts only the INVITE data and routes the extracted INVITE data to the corresponding network node. Position information formats of the SIP data packet will be described in detail with reference to FIGS. 5 and 6.

Therefore, upon receiving the LTE CONNECTION REQUEST message of step 412, the E-CN 403 sets up an SIP RAB for later SIP data exchange with the UE 401. The SIP RAB refers to a data transmission path between the E-RAN 402 and the E-CN 403, the UE 401 and the E-RAN 402, for SIP data exchange with the UE 401.

In step 421, the E-CN 403 sets mapping information between the SIP RAB to be set up in steps 413 to 414 for later SIP data exchange with the UE 401, and the INVITE extracted through the LTE CONNECTION REQUEST message of step 412, and maintains the mapping information. This enables transmission of response SIP data for the UE 401 through the SIP RAB set up in steps 413 to 414, when the E-CN 403 later receives the response SIP data for the INVITE after routing the INVITE to the corresponding network node.

Mapping between the response SIP data to be later received for the INVITE, and the SIP RAB to be set up for the UE can be implemented in several ways.

For example, if the E-CN 403 maps an SIP RAB id to an address (for example, including Internet Protocol (IP) source address, IP destination address, source port address, destination port address, and the like) of the routed INVITE, and later receives SIP data (for example, if an IP source address of the INVITE is set as an IP destination address of the SIP data received later) mapped to an INVITE address stored as the mapping information, it transmits the received SIP data through the SIP RAB indicated by the mapped SIP RAB id. This method is an example, and the E-CN 403 can map the SIP RAB to be set up for the UE in steps 413 to 414, to the future response SIP data for the routed INVITE in various manners.

In step 413, the E-CN 403 receiving the LTE CONNECTION REQUEST message, delivers the security-related parameters to the E-RAN 402 through the LTE CONNECTION RESPONSE message. This sets up an SIP data transmission path between the E-RAN 402 and the E-CN 403 for setup of an SIP RAB to be used for later SIP data exchange with the UE 401. That is, the LTE CONNECTION RESPONSE message is one control message reconfigured from all necessary information of the message transmitted from the E-CN 403 before INVITE transmission. The LTE CONNECTION RESPONSE message can further include new control information not included in the existing 3GPP system. That is, the control message can be composed of the necessary information included in the SECURITY MODE COMMAND, RAB ASSIGNMENT REQUEST, and service request messages that the E-CN 403 transmits before the INVITE transmission in the existing 3GPP system, and the new control information.

Assuming that the deciphering and/or integrity protection check is performed on the LTE CONNECTION REQUEST message of step 411 in the E-CN 403, as to an AS control message I of step 413, the E-CN 403 receives the message of step 411 forwarded from the E-RAN 402, and re-receives an AS control message part needed by the E-RAN 402 through the LTE CONNECTION RESPONSE message. That is, the AS control message I of step 413 is equal to the AS control message included in the LTE CONNECTION REQUEST message of step 411.

In step 423, the E-CN 403 receiving the LTE CONNECTION REQUEST message of step 412 extracts an INVITE data packet from the received message to use INVITE packet position information included in the LTE CONNECTION REQUEST message, and then routes the INVITE to the corresponding network node. The corresponding network node can be, for example, a Proxy Call Server Control Function (P-CSCF) of the 3GPP system. Because the LTE system according to the present invention may have a different structure from that of the 3GPP system, the network node to which the E-CN 403 routes the INVITE is not limited to a specific entity. A function of the P-CSCF and a definition thereof are given in TS 23.228 v680 of 3GPP.

The INVITE packet routing of step 423 is performed before or at step 413.

In step 414, the E-RAN 402 delivers the LTE CONNECTION RESPONSE message along with the AS control message to be transmitted to the UE 401. The AS control message is denoted by AS control message II. The AS control message included in step 414 is composed of the necessary information included in the SECURITY MODE COMMAND and RADIO BEARER SETUP messages that the E-RAN 402 transmits to the UE 401 before INVITE transmission, and new control information. In this case, there is no need to include information on the AS control message I of step 413.

Therefore, in step 414, the UE 401 receiving the AS control message sets up an SIP data transmission path to the E-RAN 402. In step 431, the E-CN 403 receives response SIP data for the INVITE of step 423. The response SIP data includes, for example, 200 OK. The 200 OK is a response message of a peer UE for a session of an IMS service requested in the INVITE. This means that the session of the IMS service will start immediately.

The E-CN 403 receiving the 200 OK sends, in step 433, the 200 OK to the UE 401 through the SIP RAB set up in steps 413 to 414, using the mapping information stored in step 421.

Figure 5:
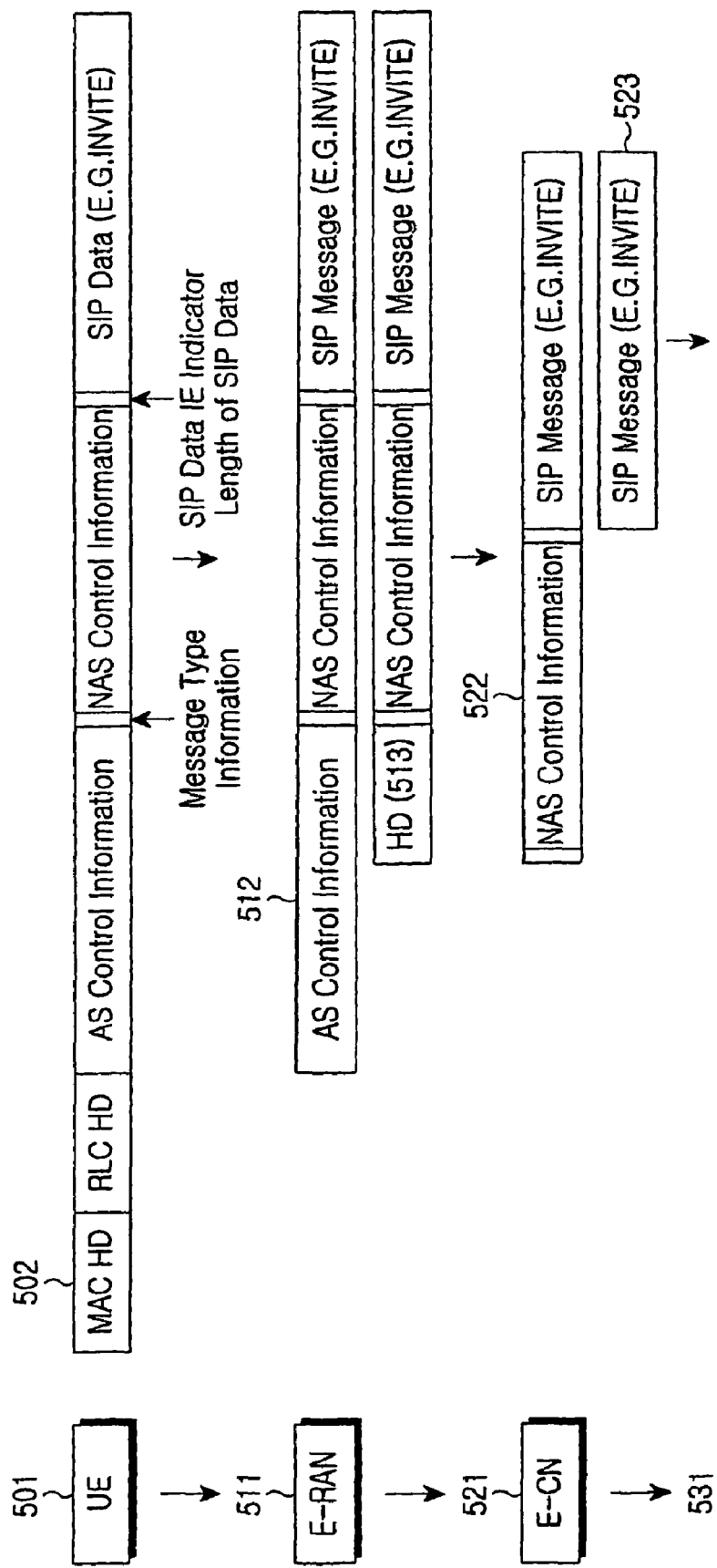
FIG. 5 is a diagram illustrating a format of a transmission message according to an embodiment of the present invention.

FIG. 5 is a diagram illustrating a format of an LTE CONNECTION REQUEST message according to an embodiment of the present invention.

Referring to FIG. 5, reference numeral 501 denotes an LTE UE, reference numeral 511 denotes an E-RAN, reference numeral 521 denotes an E-CN, and reference numeral 531 denotes a destination network node to which the E-CN routes the INVITE, like a P-CSCF. The P-CSCF 531, which is a logical entity, can be an entity that is physically identical to the E-CN 521. This is an example where the P-CSCF is a destination network node to which the INVITE is routed, in the 3GPP system. In the LTE system, the P-CSCF can be another logical entity.

Reference numeral 502 denotes a format of an LTE CONNECTION REQUEST message transmitted by the LTE UE 501. This is a format of the message of step 411 of FIG. 4, and the LTE CONNECTION REQUEST message format 502 indicates a message format in a MAC layer of the UE 501.

If there is a need for SIP data transmission as the IMS service is triggered by an upper layer (herein, INVITE is assumed to be transmission SIP data, by way of example), an INVITE is received from the upper layer.

The UE 501 generates a NAS control message, which will include the INVITE. Here, a layer that generates the NAS control message should have information indicating the inclusion of the INVITE in the LTE CONNECTION REQUEST message, and length information of the INVITE packet. In order for the corresponding NAS layer to have the information, an interface capable of exchanging the information should exist between a user plane that manages data transmission, and a control plane that manages control message transmission.

If the corresponding NAS layer has the INVITE inclusion indication information and the INVITE packet length information, it generates a NAS control message by setting the information indicating an LTE CONNECTION REQUEST message including INVITE data packet in a message type information field of the NAS control message. Accordingly, from the message type information, the E-CN 521 can determine that the LTE CONNECTION REQUEST message includes the INVITE data packet. In addition, the E-CN 521 can analyze the INVITE-related field information.

In generating the message, the UE 501 sets the message type information indicating an LTE CONNECTION REQUEST message including an INVITE data packet, includes NAS control information in a NAS control message, and sets an SIP data indicator and SIP data packet length information in the last field. The SIP data indicator is an information element indicator indicating inclusion of the SIP data packet length information and the SIP data packet, and the SIP data packet length information indicates a packet length of the SIP data.

Therefore, with the use of the SIP data packet length information, the E-CN 521 can extract SIP data corresponding to the SIP data packet length information beginning after the SIP data packet length information field. That is, based on the information, the E-CN 521 can extract the INVITE from the LTE CONNECTION REQUEST message. The SIP data indicator and the SIP data packet length information are predetermined. For example, a 1-octet SIP data indicator and 2-octet SIP data packet length information are set.

As another example, the UE 501 can use only the SIP data indicator, omitting the SIP data packet length information. By doing so, the E-CN 521 can extract the INVITE by separating the whole of the LTE CONNECTION REQUEST message received after the SIP data indicator.

As a further example, the UE 501 can use only the message type information of the NAS control message, omitting the SIP data indicator and the SIP data packet length information. In this case, the E-CN 521 receiving the LTE CONNECTION REQUEST message can extract the INVITE by analyzing all of the NAS control information of the NAS control message and then separating the whole of the LTE CONNECTION REQUEST message received thereafter, depending on the NAS message type information indicating that the LTE CONNECTION REQUEST message includes the INVITE.

In the latter two examples, the INVITE cannot be included in the NAS control message.

The UE 501 can merge the generated NAS control message and the INVITE into one message. In this case, the INVITE is attached to the rear of the SIP data indicator and the SIP data packet length information of the NAS control message.

After receiving the INVITE from an upper layer, the UE 501 forwards the INVITE to a corresponding NAS layer that generates the NAS control message of the LTE CONNECTION REQUEST message via an interface. The NAS layer generates the NAS control message, and can merge the forwarded INVITE and the NAS control message into one message.

Alternatively, the UE 501 can receive the NAS message and the INVITE generated by its separate layers or function blocks, and combine them into one message.

Similarly, this is applied to a process of merging the AS control message.

That is, in the present invention, the UE 501 includes the separate layers or function blocks, and merges an INVITE received from an upper layer, a NAS control message received from a NAS layer, and an AS control message received from an AS layer (RRC layer), into one message.

Alternatively, the UE 501 can perform a series of processes of forwarding an INVITE received from the upper layer to the NAS layer, merging the INVITE and a NAS control message when the NAS layer generates the NAS control message, forwarding the merged message to the AS layer, and merging, when the AS layer generates an AS message, the merged message forwarded to the AS layer and the AS message into one message.

A Radio Link Control Header (RLC HD) of the message format 502 is header field information added by an RLC layer that manages segmentation and repetition of Service Data Units (SDU) of the LTE CONNECTION REQUEST message. The RLC HD includes the RLC Sequence Number (SN) and Length Indicator (LI).

A Multiple Access Control Header (MAC HD) of the message format 502 is header field information added by a MAC layer that performs Channel Multiplexing and Hybrid Automatic Repeat Request (HARQ) operations. The MAC HD can include UE id, Data Description Indicator (DDI), and HARQ information.

In the LTE system, the RLC HD and the MAC HD may have different header field information formats from those of the 3GPP system. A detailed description of the RLC header in the 3GPP system is provided in TS 25.322 v660 of 3GPP, and a detailed description of the MAC header is provided in TS 25.321 v670 of 3GPP.

Reference numeral 512 denotes a format of a message received from an AS layer (RRC layer) of the E-RAN 511. The MAC HD and the RLC HD were removed by the MAC layer and the RLC layer. Therefore, the message of the E-RAN 511 is composed of the AS control message part, the NAS control message part and the INVITE.

The E-RAN 511 forwards the NAS control message part and the INVITE to a corresponding E-CN based on a temporary ID (i.e. P-TMSI) of the UE 501 and information on the E-CN selected by the UE 501, included in the AS control message part of the message format 512. When the E-RAN 511 performs the deciphering and/or integrity protection check on the LTE CONNECTION REQUEST message, after successful completion of the deciphering and/or integrity protection check, the E-RAN 511 analyzes and manages the AS control information included in the AS control message.

The E-RAN 511 sends the NAS control message and the INVITE except for the AS control message part to the E-CN 521. An additional header can be attached thereto due to a transmission interface between the E-RAN 511 and the E-CN 521. Reference numeral 513 denotes a format of a transmission message from a lower layer in the E-RAN 511, to which an additional header is attached.

Reference numeral 522 denotes a format of a message received from a NAS layer of the E-CN 521. This is a message format from which the additional header attached by the E-RAN 511 is removed in the lower layer.

The NAS layer of the E-CN 521, based on message type information in the NAS control message, can determine that the INVITE is included in the LTE CONNECTION REQUEST message. Further, the NAS layer can analyze the additionally included INVITE-related field information. The additionally included INVITE-related field information may include the SIP data indicator indicating start of the INVITE packet and the SIP data packet length information.

The E-CN 521 recognizes the scheduled start of the INVITE from the SIP data indicator, and recognizes a size of the INVITE packet from the SIP data packet length information. The E-CN 521 can extract the INVITE corresponding to the INVITE length information beginning from the rear of the SIP data packet length information.

Reference numeral 523 denotes the extracted INVITE, and the E-CN 521 routes the message of the format 523 to the corresponding network node 531.

Figure 6:
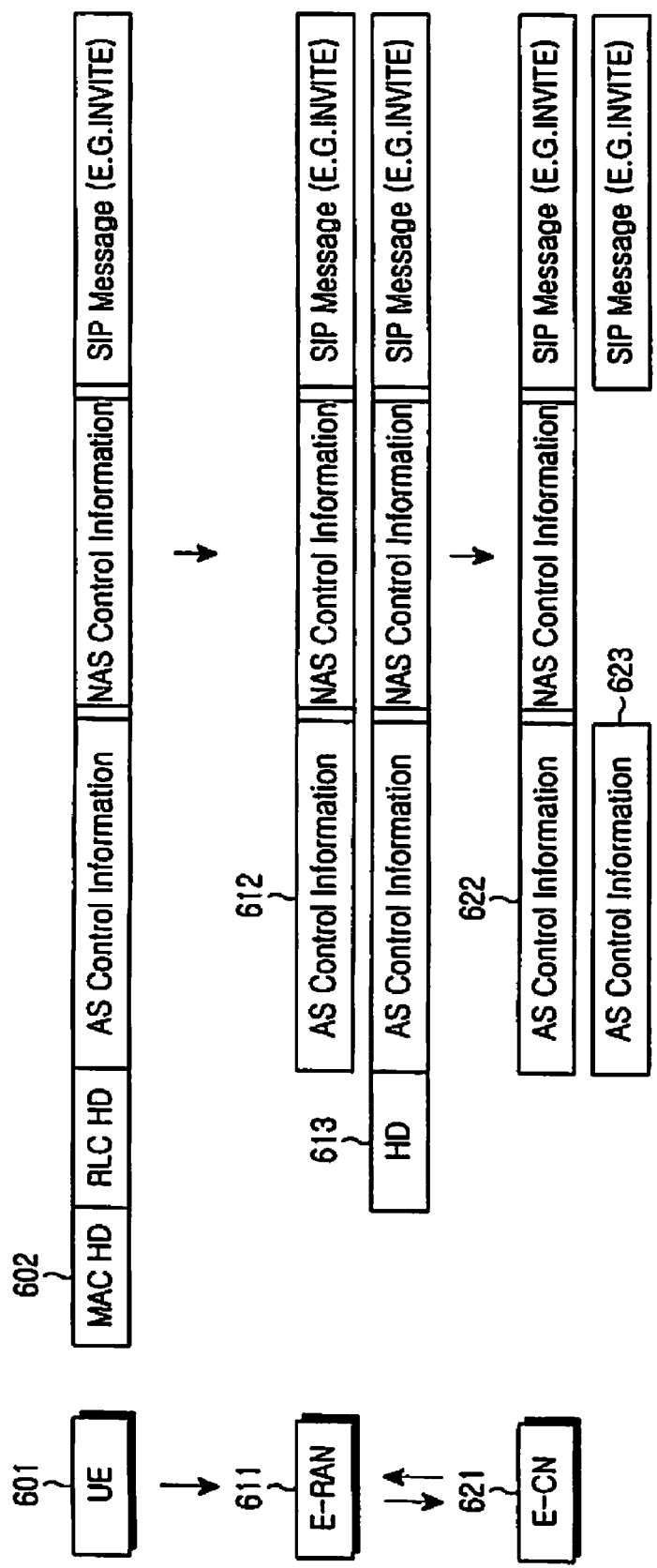
FIG. 6 is a diagram illustrating a format of a transmission message according to another embodiment of the present invention.

FIG. 6 is a diagram illustrating a transmission format of an LTE CONNECTION REQUEST message according to another embodiment of the present invention. Specifically, FIG. 6 illustrates a message format for the case where an E-CN performs the deciphering and/or integrity protection check on the LTE CONNECTION REQUEST message.

Referring to FIG. 6, reference numeral 602 denotes an LTE CONNECTION REQUEST message transmitted from a UE 601, and the LTE CONNECTION REQUEST message is a merged message of an AS control message, a NAS control message, and an INVITE. The NAS control message includes message type information, SIP data indicator, and SIP data packet length information. The message 602 has the same format as the message 502 of FIG. 5.

However, because the E-CN 621 performs the deciphering and/or integrity protection check on the LTE CONNECTION REQUEST message, instead of removing the AS control message information from the message and transmitting the message to the E-CN 621, an E-RAN 611 attaches only a header 613, if needed, to a received message 612 and sends the resulting message to the E-CN 621 as it is. That is, the message 612 of the E-RAN 611 is a message transmitted to the E-CN 621, and includes all of the AS control message 622, 623, the NAS control message, and the INVITE.

Therefore, after receiving one whole message and successfully performing the deciphering and/or integrity protection check thereon, the E-CN 621 includes the AS control message in the LTE CONNECTION RESPONSE message and re-delivers it to the E-RAN 611.

Figure 7:
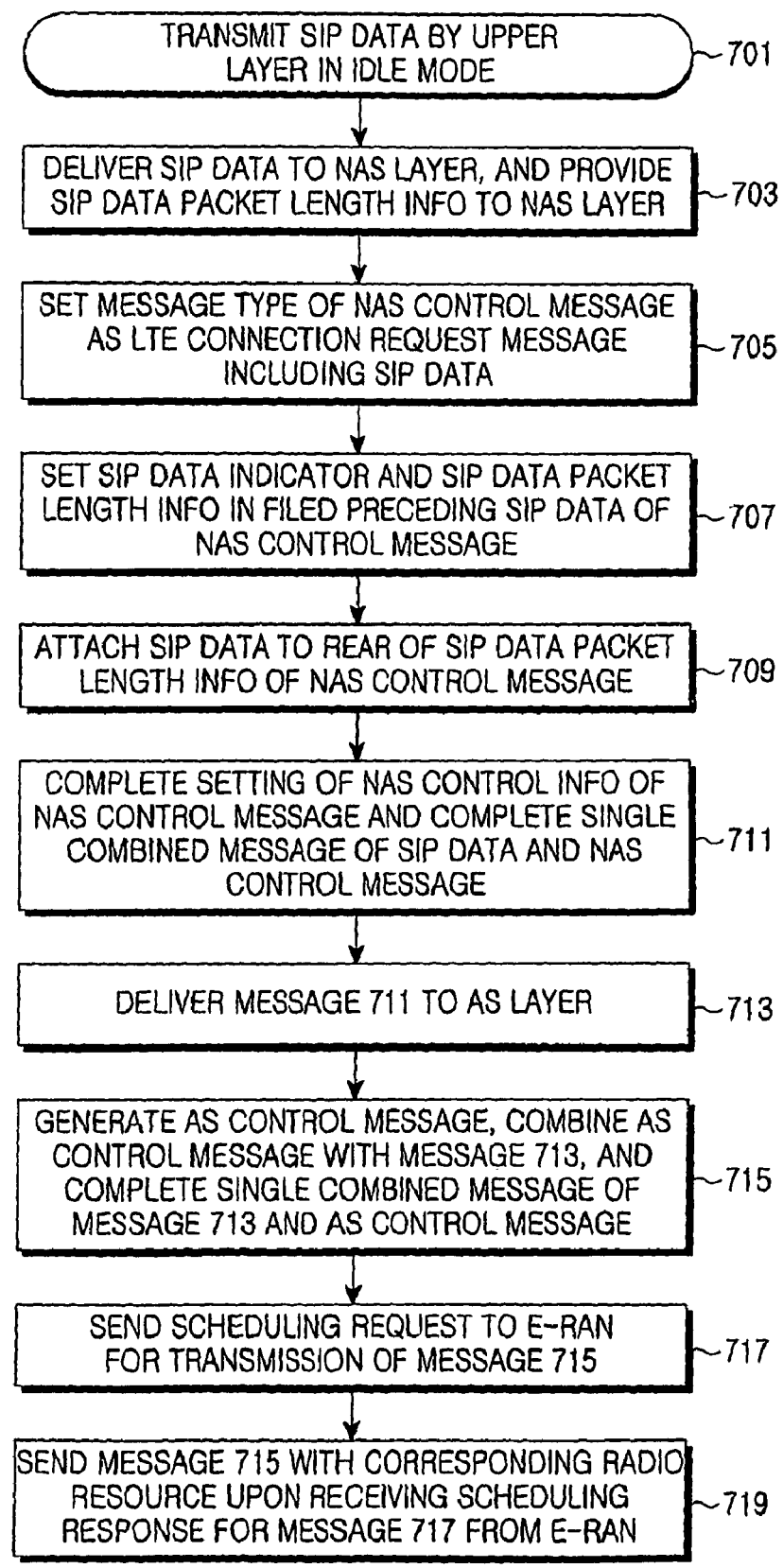
FIG. 7 is a flowchart illustrating an operation of a UE according to an embodiment of the present invention.

FIG. 7 is a flowchart illustrating an operation of a UE according to an embodiment of the present invention.

Referring to FIG. 7, in step 701, a UE in an idle mode triggers SIP data transmission by an upper layer. In step 701, upon receiving SIP data from the upper layer, the UE sends the SIP data to a NAS layer to combine the SIP data with a NAS control message when the NAS layer generates the NAS control message, and sends the combined message to an AS layer to re-combine the combined message with an AS control message when the AS layer generates the AS control message, thereby generating one message. Therefore, the SIP data received from the upper layer in step 701 is assumed to be an INVITE.

In step 703, the UE forwards the INVITE received from the upper layer to a NAS (control) layer. The UE can send SIP data packet length information to the NAS layer together with the INVITE.

In step 705, the NAS layer sets message type information of the NAS control message, such that it indicates an LTE CONNECTION REQUEST message including SIP data.

In step 707, the UE sets the NAS control message in a determined order of the LTE CONNECTION REQUEST message, and sets the SIP data indicator and SIP data packet length information for the INVITE in the NAS control message. As for the SIP data packet length information, the UE can set the SIP data packet length information received in step 703, or can measure a length of the SIP data received in step 703 and then set the measured length as the SIP data packet length information.

In step 709, the UE attaches the SIP data to the rear of the SIP data packet length information of the NAS control message.

In step 711, if there is a need to set the remaining NAS control information, the UE continuously sets the remaining NAS control information following the included SIP data, and completes a single combined message of the SIP data and the NAS control message.

In step 713, the UE delivers the combined message generated in step 711 to the AS (control) layer.

In step 715, the AS layer generates an AS control message, and completes a single combined message of the AS control message and the message combined in step 713.

That is, in step 715, the UE completes one LTE CONNECTION REQUEST message by combining 'the SIP data' plus 'the NAS control message of the NAS layer' plus 'the AS control message of the AS layer'.

In step 717, the UE sends a scheduling request to an E-RAN for transmission of the message generated in step 715. In the scheduling request, the UE requests the E-RAN to allocate radio resource corresponding to a size of the message 715.

In step 719, upon receiving a scheduling response message corresponding to the message 717 from the E-RAN, the UE sends the message generated in step 715 using the allocated radio resource included in the scheduling response message.

Although not illustrated in FIG. 7, when SIP RAB transmission occurs later, if the UE is not in the idle mode, it transmits SIP data through the SIP RAB allocated to the UE. That is, the series of processes of FIG. 7 is applied only when the UE is in the idle mode and there is a need for SIP data transmission by the upper layer.

Figure 8:
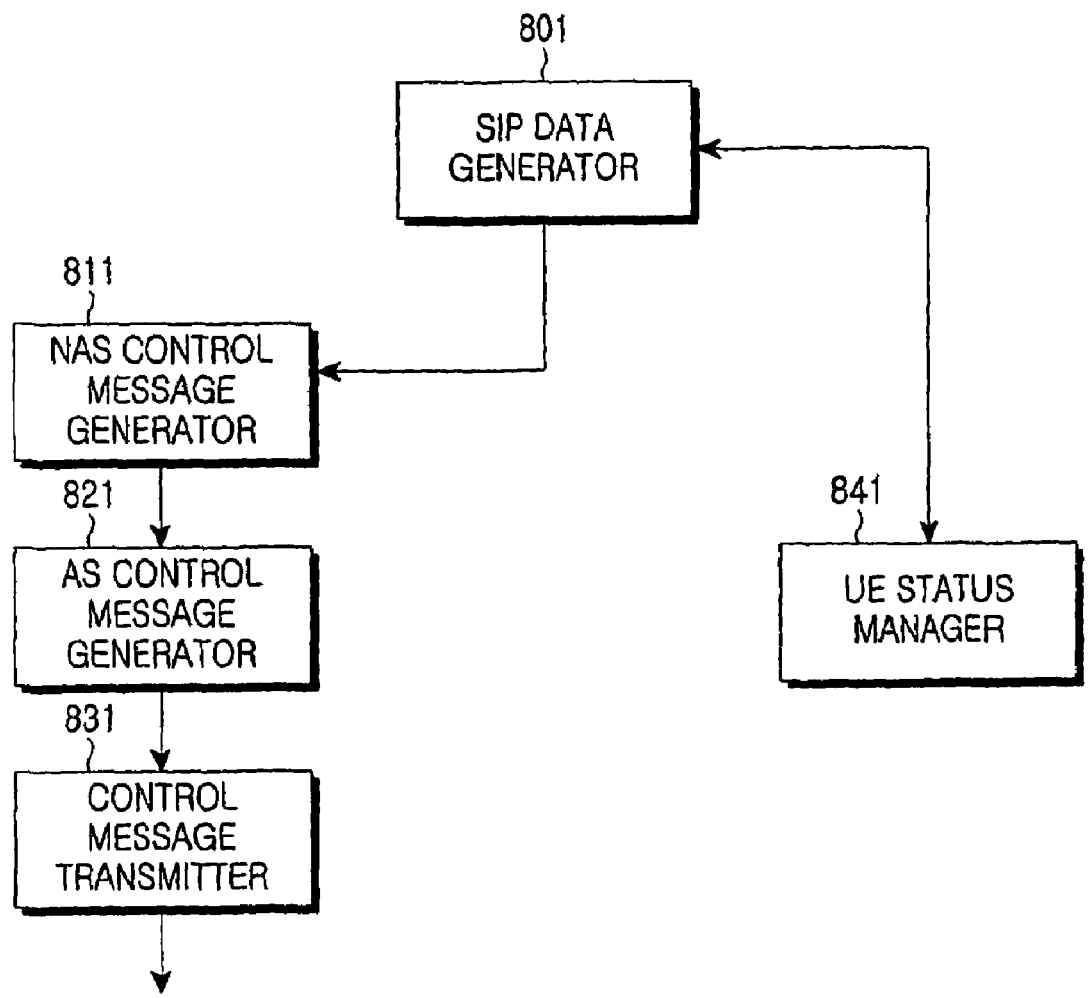
FIG. 8 is a block diagram illustrating a structure of a UE apparatus according to an embodiment of the present invention.

FIG. 8 is a block diagram illustrating a structure of a UE apparatus according to an embodiment of the present invention.

Referring to FIG. 8, upon receiving SIP data from an upper layer, a UE sends the SIP data to a NAS layer to combine a NAS control message with the SIP data when the NAS layer generates the NAS control message, and sends the combined message to an AS layer to re-combine the combined message with an AS control message when the AS layer generates the AS control message, thereby generating a single message.

Reference numeral 801 denotes an SIP data generator of a data plane. The SIP data generator 801 determines a need for SIP data transmission due to start of a session of an IMS service, and generates SIP data. The SIP data is herein assumed to be an INVITE.

The SIP data generator 801 generates the INVITE, and acquires information indicating whether the UE is currently in an idle mode or a connected mode through an interface from a UE status manager 841.

If the UE is not in the idle mode, it transmits the INVITE through an SIP RAB because the SIP RAB is already set up. However, if the UE is in the idle mode, it transmits the INVITE through an LTE CONNECTION REQUEST message.

Therefore, upon determining that status information of the UE indicates the idle mode through the interface with the UE status manager 841, the SIP data generator 801 delivers the generated INVITE to a NAS control message generator 811. The SIP data generator 801 may also deliver length information of the INVITE packet.

The UE status manager 841 may be an AS (control) layer including an AS control message generator 821, or may be a separate block located in the upper layer.

The NAS control message generator 811 is included in the NAS (control) layer. The NAS control message generator 811 generates a NAS control message to be included in the LTE CONNECTION REQUEST message. After setting NAS message type information including the INVITE and setting an SIP data indicator and SIP data packet length information, the NAS control message generator 811 generates a single combined message by combining the received INVITE with the generated NAS control message. After setting of all NAS control information is completed, and the single combined message of the INVITE and the NAS control message is completely generated, the NAS control message generator 811 sends the combined message to the AS control message generator 821. The NAS control message generator 811 can also send length information of the combined message.

The AS control message generator 821 is included in the AS layer. The AS control message generator 821 generates an AS control message to be included in the LTE CONNECTION REQUEST message, and generates one LTE CONNECTION REQUEST message composed of 'INVITE' plus 'NAS control message' plus 'AS control message' by recombining the combined message of 'the received INVITE' plus 'the NAS control message' with the AS control message.

A control message transmitter 831 transmits the generated LTE CONNECTION REQUEST message to an E-RAN.

Figure 9:
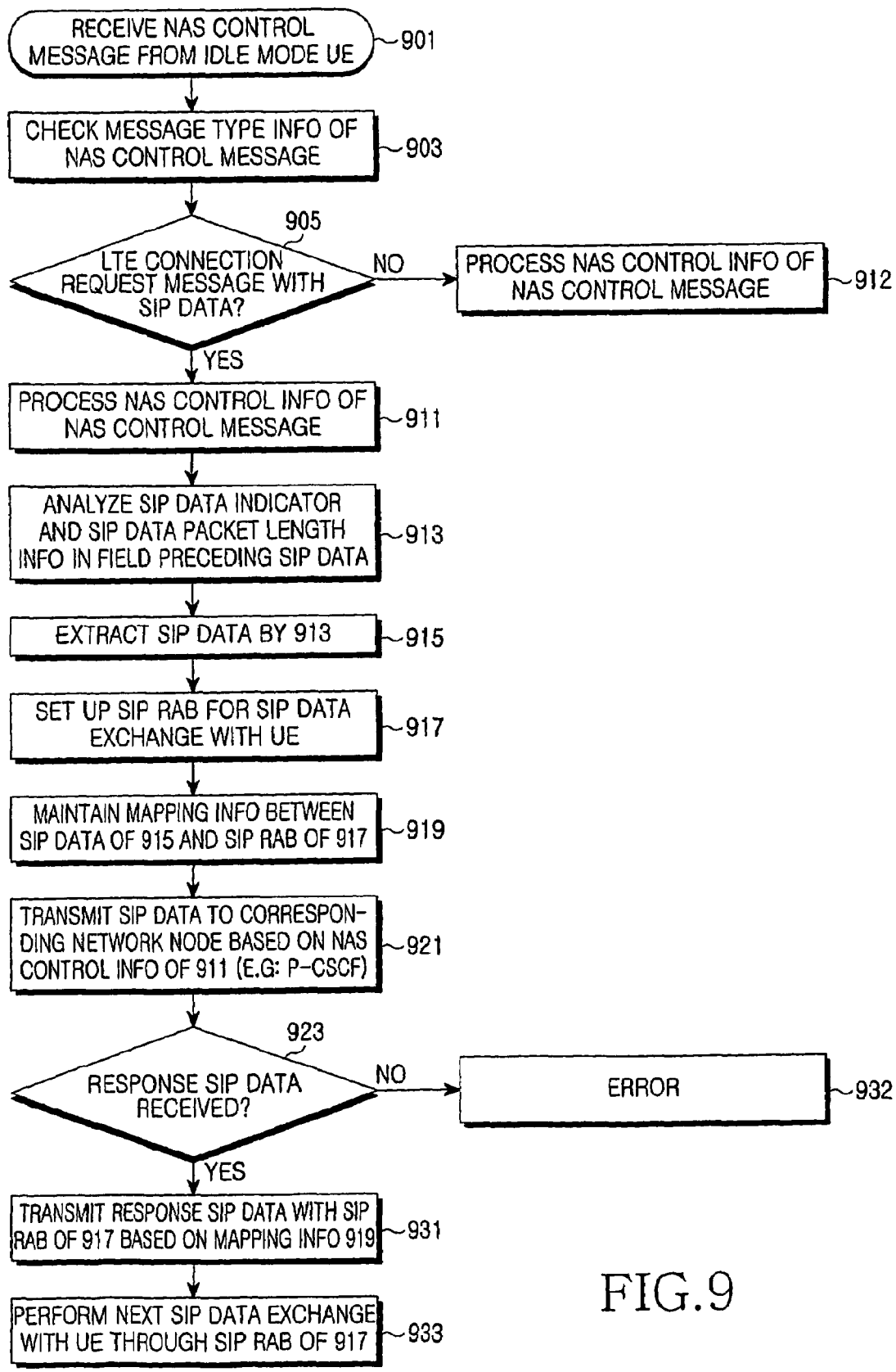
FIG. 9 is a flowchart illustrating an operation of a network node according to an embodiment of the present invention.

FIG. 9 is a flowchart illustrating an operation of an E-CN according to an embodiment of the present invention.

Referring to FIG. 9, in step 901, the E-CN receives a NAS control message from an idle mode UE.

In step 903, the E-CN checks message type information of the received NAS control message.

If it is determined in step 905 that the NAS control message type information indicates an LTE CONNECTION REQUEST message including SIP data, the E-CN proceeds to step 911 where it processes NAS control information of the NAS control message. In step 913, the E-CN analyzes an SIP data indicator and SIP data packet length information in the field where additional information on the SIP data is included.

However, if it is determined in step 905 that the message type information does not indicate an LTE CONNECTION REQUEST message including SIP data, the E-CN proceeds to step 912 where it analyzes and manages only the NAS control information of the NAS control message as indicated by the message type information, without the need for performing an SIP data transmission operation of extracting SIP data from the NAS control message and routing the extracted SIP data.

In step 915, based on the information of step 913, the E-CN extracts SIP data included in the NAS control message. The SIP data is herein assumed to be an INVITE.

In step 917, the E-CN transmits an LTE CONNECTION RESPONSE message to an E-RAN in order to set up an SIP RAB for later SIP data exchange with the UE. If the SIP RAB is set up in step 917, the E-CN transmits transmission SIP data to the UE through the SIP RAB.

In step 919, the E-CN generates mapping information between the SIP RAB set up for the UE in step 917 and the INVITE, which is SIP data of step 915, and maintains the generated mapping information.

This is due to the fact that SIP data responding to the INVITE of step 915 is later received from a peer UE. For example, if 200 OK is later received from the peer UE, the E-CN should transmit the received data through the SIP RAB of step 917 set up for the UE.

In step 919, the mapping information can be generated by mapping IP address information of the INVITE to a RAB ID of the SIP RAB set up in step 917. That is, if a 200 OK SIP packet having a source IP address of the INVITE as a destination IP address is later received, the E-CN can transmit the 200 OK through the SIP RAB indicated by a RAB id mapped to the source IP address of the INVITE.

In step 921, the E-CN transmits the INVITE of step 915 to a corresponding network node, using NAS control information included in the NAS control message of step 911.

In step 923, the E-CN checks if it has received response SIP data for the INVITE of step 915. For example, the response SIP data for the INVITE may include 200 OK. The check can be performed using the mapping information of step 919.

If the E-CN has received the response SIP data for the INVITE in step 923, the E-CN proceeds to step 931 where it transmits the response SIP data through the SIP RAB of step 917 set up to the UE, using the mapping information of step 919. However, if the E-CN fails to receive the response SIP data in step 923, the E-CN goes to step 932 where it performs a corresponding error process.

In step 933, the E-CN performs later SIP data exchange for the UE through the set SIP RAB.

Figure 10:
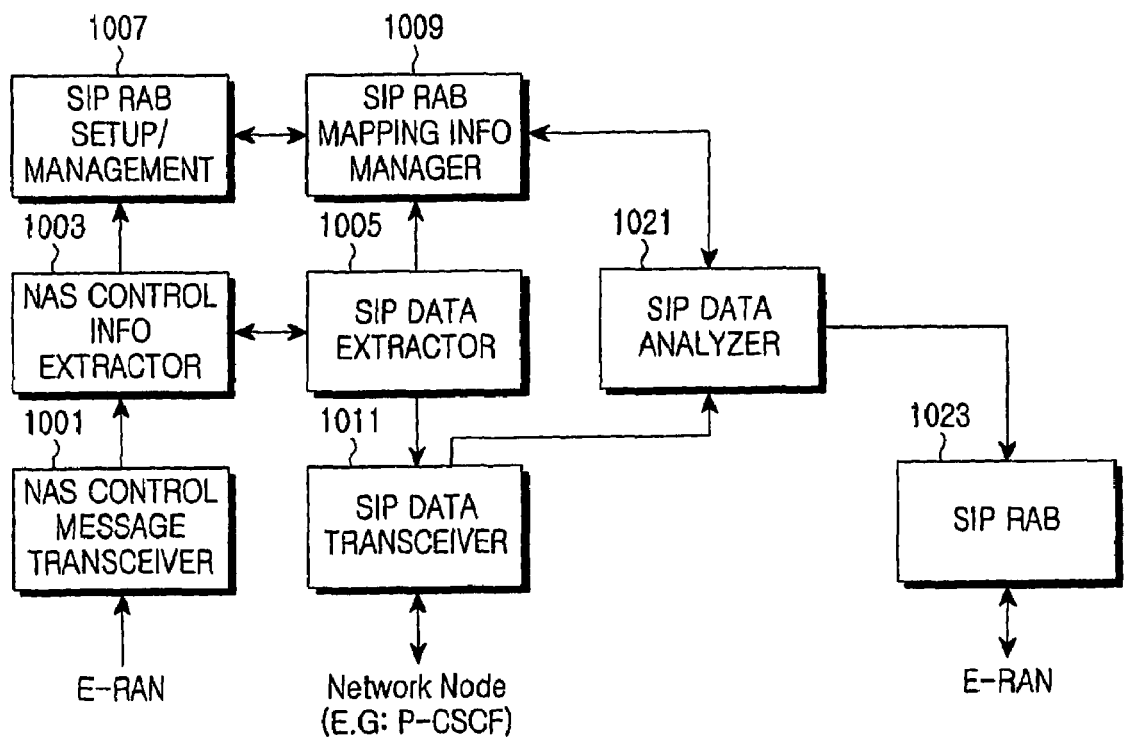
FIG. 10 is a block diagram illustrating a structure of a network node according to an embodiment of the present invention.

FIG. 10 is a block diagram illustrating a structure of a network node according to an embodiment of the present invention.

Referring to FIG. 10, reference numeral 1001 denotes a transceiver of a NAS control message from an E-RAN.

The NAS control message transceiver 1001 delivers a NAS control message received from an E-RAN to a NAS control information extractor 1003. The NAS control information extractor 1003 analyzes message type information of the NAS control message. If the message type information indicates an LTE CONNECTION REQUEST message including SIP data, an SIP data extractor 1005 extracts corresponding SIP data using the SIP data indicator and SIP data packet length information.

An SIP RAB setup/management unit 1007 sets up an SIP RAB for SIP data exchange with the UE, and manages information on the SIP RAB.

The NAS control information extractor 1003 finds a network node to which it should route the SIP data, using NAS control information.

An SIP RAB mapping information manager 1009 maintains mapping information between the extracted SIP data and the SIP RAB set up for the UE in order to transmit, when it later receives response SIP data for the SIP data from a peer UE, the received response SIP data through the SIP RAB for the UE.

An SIP data transceiver 1011 routes the SIP data to the corresponding network node.

If the SIP data transceiver 1011 has received response SIP data corresponding to the SIP data transmitted to the corresponding network node via the SIP data extractor 1005, for example, has received 200 OK for the INVITE, an SIP RAB unit 1023 transmits the response SIP data to an E-RAN using the SIP RAB already set up for the UE via an SIP data analyzer 1021 and the SIP RAB mapping information manager 1009.

As can be understood from the foregoing description, in transmitting an SIP message, an idle mode UE according to the present invention transmits one LTE CONNECTION REQUEST message including an AS control message, a NAS control message and SIP data, thereby simplifying connection setup procedures between a source node and a destination node. That is, the present invention contributes to a reduction in an end-to-end delay for service initiation due to the SIP message transmission.

In addition, the UE transmits one combined message of an AS control message and a NAS control message including information indicating transmission of an SIP message, thereby allowing an upper node to reduce a delay due to message processing.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for transmitting Session Initiation Protocol (SIP) data by an idle mode User Equipment (UE) in a mobile communication Internet Protocol Multimedia Subsystem (IMS) system, the method comprising the steps of:
    delivering SIP data received from an upper layer in an idle mode to a Non Access Stratum (NAS) layer;
    setting a message type of a NAS control message, by the NAS layer, as a Long Term Evolution (LTE) connection request message comprising the SIP data;
    setting an indicator and length information of the SIP data in the NAS control message in front of a part where the SIP data is to be included, generating a single combined message by attaching the SIP data to the rear of the length information of the NAS control message, and delivering the generated single combined message to an Access Stratum (AS) layer;
    generating an AS control message by the AS layer, and generating an LTE connection request message by the AS layer by combining the generated combined message with the AS control message;
    sending a scheduling request to an Evolved Radio Access Network (E-RAN); and
    sending the LTE connection request message to the E-RAN using allocated radio resources in response to a scheduling response message received from the E-RAN.

2. The method of claim 1, further comprising delivering the length information of the SIP data to the NAS layer along with the SIP data.

3. The method of claim 1, wherein the length information of the SIP data is set as provided SIP data packet length information, or is set by measuring a length of the SIP data.

4. A method for transmitting Session Initiation Protocol (SIP) data of an idle mode User Equipment (UE) in a mobile communication Internet Protocol Multimedia Subsystem (IMS) system, the method comprising the steps of:
    receiving a Long Term Evolution (LTE) connection request message from the idle mode UE, and checking message type information of a Non Access Stratum (NAS) control message included in the LTE connection request message;
    when the message type information indicates an LTE connection request message comprising SIP data, processing NAS control information of the NAS control message, extracting indicator and length information for the SIP data from the NAS control message, and analyzing the extracted indicator and the length information;
    extracting the SIP data from the LTE connection request message;
    sending an LTE connection response message to an Evolved Radio Access Network (E-RAN) to set up an SIP Radio Access Bearer (RAB) to the UE;
    sending the SIP data to a corresponding destination network node using NAS control information included in the NAS control message; and
    sending response SIP data through the SIP RAB, upon receipt of the response SIP data for the SIP data.

5. The method of claim 4, further comprising:
    when the message type information does not indicate an LTE connection request message comprising SIP data, extracting SIP data from the NAS control message, and analyzing and managing NAS control information indicated by the message type information.

6. A method for transmitting/receiving data through a Session Initiation Protocol (SIP) in a mobile communication system, the method comprising the steps of:
    including data to be transmitted through the SIP in a connection request message composed of Access Stratum (AS) control information needed in an Evolved Radio Access Network (E-RAN) and Non Access Stratum (NAS) control information needed in an Evolved Core Network (E-CN), and sending the connection request message to the E-CN, by an idle mode User Equipment (UE);
    setting a Radio Access Bearer (RAB) for transmitting the data using the NAS control information, and sending a connection response message comprising the AS control information to the E-RAN, by the E-CN; and
    setting up a Radio Resource Control (RRC) connection for transmitting the data using the AS control information, and sending the connection response message to the UE, by the E-RAN.

7. The method of claim 6, further comprising:
checking deciphering and integrity protection on the connection request message, by the E-CN.

8. The method of claim 6, further comprising:
managing mapping information between the data and the RAB set up for transmission of the data, by the E-CN;
extracting position information from the data, and routing the data corresponding to the position information to a destination network node; and
upon receipt of a response message from the destination network node corresponding to the data to be transmitted through the SIP, sending the response message to the UE through the set RAB using the mapping information.

9. The method of claim 6, further comprising:
including indication information indicating transmission of the data to be transmitted through the SIP, in the NAS control information, by the UE.

10. The method of claim 6, further comprising:
including packet length information of the data to be transmitted through the SIP, in the NAS control information, by the UE.

11. The method of claim 6, further comprising:
setting message type information of the connection request message, as a connection request message comprising the data to be transmitted through the SIP, by the UE.

12. The method of claim 6, further comprising:
transitioning to a connected mode upon receipt of the connection response message, by the UE.

13. The method of claim 12, further comprising:
exchanging the data through the SIP with a destination network node, by the UE, after transitioning from idle mode to the connected mode.

14. A method for transmitting/receiving data through a Session Initiation Protocol (SIP) in a mobile communication system, the method comprising the steps of:
including data to be transmitted through the SIP in a connection request message composed of Access Stratum (AS) control information needed in an Evolved Radio Access Network (E-RAN) and Non Access Stratum (NAS) control information needed in an Evolved Core Network (E-CN), and sending the connection request message to the E-RAN, by an idle mode User Equipment (UE);
performing deciphering and/or integrity protection check on the connection request message, extracting and managing AS control information from the connection request message, and transmitting the connection request message comprising the NAS control information and the data to the E-CN, by the E-RAN;
setting up a Radio Access Bearer (RAB) for transmitting the data using the NAS control information, and sending a connection response message to the E-RAN, by the E-CN; and
setting up a Radio Resource Control (RRC) connection for transmitting the data using the AS control information, and sending the connection response message to the UE, by the E-RAN.

15. A User Equipment (UE) apparatus for transmitting multimedia data through a Session Initiation Protocol (SIP), the UE apparatus comprising:
a data generator for generating multimedia data to be transmitted through the SIP;
a status manager for monitoring a mode of the UE;
a first control message generator for generating a Non Access Stratum (NAS) control message including control information for Radio Access Bearer (RAB) setup due to an idle mode from the status manager, and multimedia data generated from the data generator;
a second control message generator for generating a connection request message including the NAS control message and control information for Radio Resource Control (RRC) setup; and
a transceiver for sending the generated connection request message to an upper node.

16. The UE apparatus of claim 15, wherein the first control message generator generates the NAS control message further including indication information indicating transmission of the multimedia data, and transmission length information of the multimedia data.

17. The UE apparatus of claim 15, wherein the first control message generator sets the NAS control message as a message including message type information indicating a message including the multimedia data transmitted/received through the SIP.

18. The UE apparatus of claim 15, wherein the data generator transmits the generated data to the upper node via the transceiver through a previously set RAB due to a connected mode from the status manager.

19. A Core Network (CN) apparatus for transmitting multimedia data through a Session Initiation Protocol (SIP), the CN apparatus comprising:
a transceiver for receiving a connection request message from a lower node;
a first control information extractor for extracting from the connection request message a Non Access Stratum (NAS) control message including control information for Radio Access Bearer (RAB) setup, which is set as message type information indicating a message including the multimedia data;
a data extractor for extracting the multimedia data from the connection request message according to the message type information;
a RAB setup manger for setting up the RAB to the lower node using the control information;
a NAS control information extractor for routing the multimedia data to a destination network node using the control information;
a mapping information manager for managing mapping information between the destination network node and the RAB set up for transmission of the multimedia data; and
a transceiver for receiving a response message corresponding to the multimedia data from the destination network node, and sending the response message to the lower node.

20. The CN apparatus of claim 19, wherein the first control information extractor extracts the NAS control message including the control information for the RAB setup, which is set as message type information indicating a message including the multimedia data, from the connection request message including the multimedia data transmitted from a User Equipment (UE), the NAS control message, and an Access Stratum (AS) control message including control information for Radio Resource Control (RRC) setup between the UE and a Radio Access Network (RAN).

* * * * *